(12) United States Patent
Kannankeril

(10) Patent No.: US 6,183,838 B1
(45) Date of Patent: *Feb. 6, 2001

(54) COMPOSITE MATERIAL HAVING GAS CAVITIES AND A MECHANICALLY BONDED PROTECTIVE LAYER AND METHOD OF MAKING SAME

(75) Inventor: Charles Paul Kannankeril, North Caldwell, NJ (US)

(73) Assignee: Sealed Air Corporation, Saddle Brook, NJ (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/823,376

(22) Filed: Mar. 24, 1997

(51) Int. Cl.[7] .................................................. B32B 5/28
(52) U.S. Cl. .................... 428/119; 428/133; 428/166; 428/178; 428/223; 428/99; 428/139; 428/137; 156/145; 156/147; 156/309.6; 442/394; 442/286
(58) Field of Search ........................ 428/119, 133, 428/166, 178, 223, 99, 139, 137; 156/145, 147, 309.6; 442/394, 286

(56) References Cited

U.S. PATENT DOCUMENTS

| | | | | |
|---|---|---|---|---|
| 3,468,311 | * | 9/1969 | Gallagher | 428/178 |
| 4,181,548 | * | 1/1980 | Weingarven | 156/145 |
| 4,313,993 | * | 2/1982 | McGlory | 428/178 |
| 4,314,865 | | 2/1982 | Ottaviano | 156/145 |
| 4,412,879 | | 11/1983 | Ottaviano | 156/145 |
| 4,614,000 | * | 9/1986 | Mayer | 5/484 |
| 4,628,549 | * | 12/1986 | Lazar | 428/88 |
| 4,698,109 | | 10/1987 | Lazar | 156/145 |
| 4,957,805 | * | 9/1990 | Biggs et al. | 428/223 |
| 5,084,324 | * | 1/1992 | Schirmer | 428/139 |

* cited by examiner

Primary Examiner—William P. Watkins, III
(74) Attorney, Agent, or Firm—Alston & Bird LLP

(57) ABSTRACT

A composite material and method of forming such composite material is provided in which first and second layers of plastic film are laminated together and define a multiplicity of spaced apart, gas filled cavities therebetween, and a third layer of a fibrous or other suitable material is mechanically bonded to one of the first and second layers of plastic film.

12 Claims, 2 Drawing Sheets

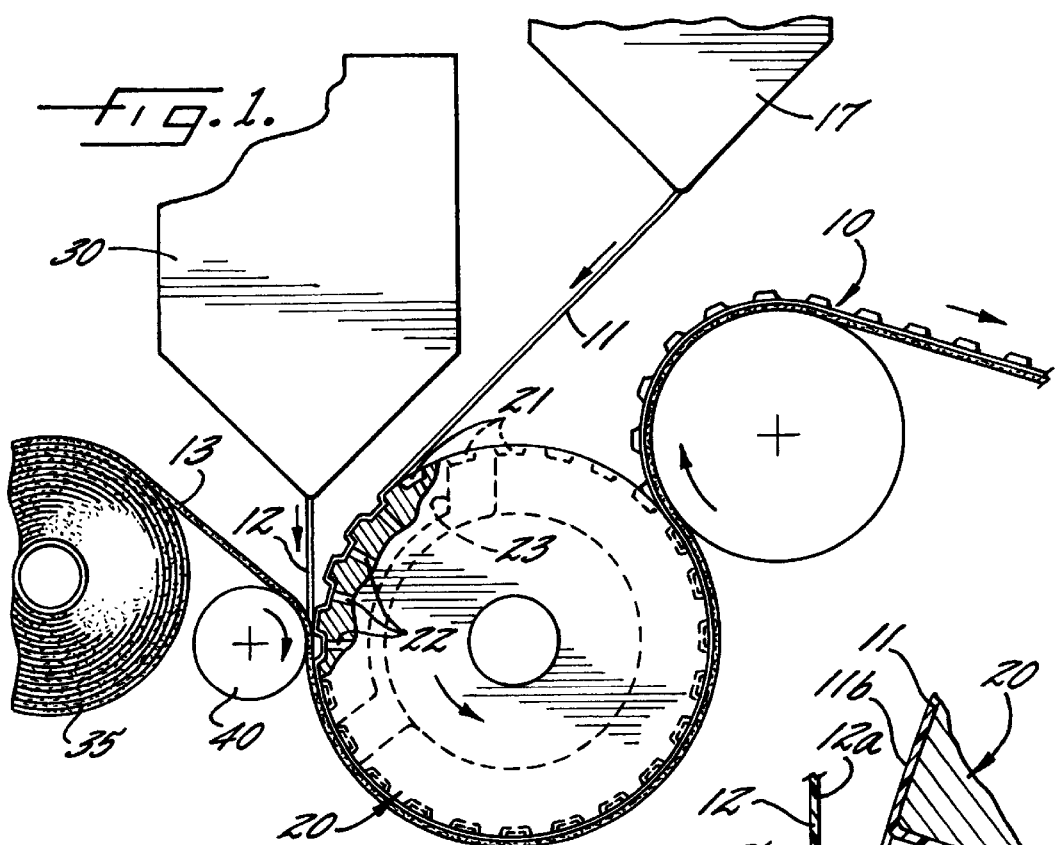
Fig. 1.
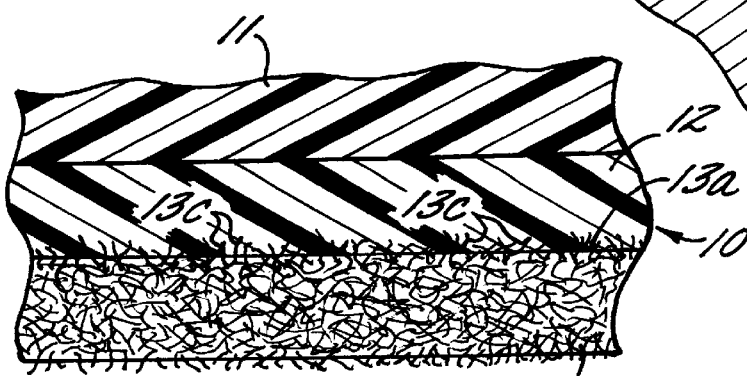
Fig. 2.
Fig. 3.

COMPOSITE MATERIAL HAVING GAS CAVITIES AND A MECHANICALLY BONDED PROTECTIVE LAYER AND METHOD OF MAKING SAME

FIELD OF THE INVENTION

The present invention relates to protective packaging or cushioning materials and more particularly to a composite protective or cushioning material and method of forming such a composite material.

BACKGROUND OF THE INVENTION

Protective and cushioning materials have a wide variety of uses in the shipping and handling of various and sundry articles and in the protection of the surfaces of such items. A particularly popular form of a protective and cushioning material is an air cellular material in which two layers of plastic film are laminated together and have a multiplicity of gas filled cavities therebetween. This air cellular material provides excellent cushioning characteristics and is relatively inexpensive.

Such air cellular material does, however, have certain deficiencies or disadvantages which limit the applicability and use thereof. One such deficiency is the surface characteristics of this air cellular material. Since the air cellular material is formed of plastic film, the surface characteristics are limited and can be considered relatively abrasive and undesirable for some uses. Also, the air cellular material is susceptible to penetration by sharp or pointed objects and to rupture of the air bubbles by those and other objects with a concomitant loss in cushioning capacity.

It has been previously proposed to improve the characteristics of such air cellular material by producing a composite material in which a third layer is combined with the air cellular material. An example of such a composite material is disclosed in U.S. Pat. No. 4,698,109, issued Oct. 6, 1987. The composite material disclosed in this patent includes an air cellular material to one side of which is fusion bonded a non-woven, fibrous layer. U.S. Pat. No. 4,698,109 clearly discloses that, to achieve such fusion bonding, i.e. heat lamination or heat sealing, the third layer must be formed of a material which is compatible with the plastic film forming the layers of the air cellular material, i.e. a polymer which can be fusion bonded to the polymer of the plastic film of the air cellular material. Specifically, this patent states that a fibrous material formed of polyethylene or polypropylene fibers would be required.

While providing certain advantages over plain air cellular material alone, this prior composite material was very limited in the surface and other characteristics which could be provided since only compatible materials could be used in forming the third layer. There is a wide variety of incompatible materials which would provide highly desirable characteristics in such a composite material which have not been used heretofore because there was no known, cost-effective way to incorporate such incompatible materials in a composite material with the air cellular material.

SUMMARY OF THE INVENTION

With the foregoing in mind, it is an object of the present invention to provide a composite material including an air cellular material and a method of forming the same which does not have the deficiencies, disadvantages and limitations of prior such composite materials.

This object of the present invention is achieved by providing a composite material including an air cellular material formed of first and second layers of plastic film laminated together and defining a multiplicity of gas filled cavities or bubbles therebetween and a third layer of material mechanically bonded to one of the first and second layers of plastic film. Since the third layer is mechanically bonded to the air cellular material, as opposed to fusion bonded, there is no requirement that the third layer be formed of a compatible material. Therefore, the third layer may be formed of a wide variety of materials, almost without limitation.

The third layer may be mechanically bonded to the air cellular material in several different ways. For example, if the third layer is formed of a fibrous material, the surface thereof contiguous to the contiguous surface of the air cellular material will have fibers projecting outwardly therefrom. These projecting fibers are embedded in the contiguous surface of the air cellular material by softening the plastic film, causing the projecting fibers to penetrate thereinto and then causing the plastic film to harden. Such projecting fibers are entrapped therein and interlock the third layer and the air cellular material. With other types of materials which do not normally have projections thereon, such projections can be provided in any number of known ways.

Alternatively, the third layer may be mechanically bonded to the air cellular material by providing cavities in the contiguous surface of the third layer and causing the plastic of the contiguous surface of the air cellular material to flow into such cavities and to harden therein. Therefore, the third layer is interlocked to the air cellular material.

BRIEF DESCRIPTION OF THE DRAWINGS

Some of the objects and advantages of the present invention having been stated, others will appear as the description proceeds when considered in conjunction with the accompanying schematic drawings, in which:

FIG. 1 is a fragmentary, schematic elevational view illustrating a preferred method of forming a composite material in accordance with the present invention;

FIG. 2 is a greatly enlarged, fragmentary sectional view of the medial portion of FIG. 1;

FIG. 3 is an enlarged fragmentary sectional view of one embodiment of a composite material incorporating the features of the present invention;

DETAILED DESCRIPTION OF THE ILLUSTRATED EMBODIMENTS

Figure 4:
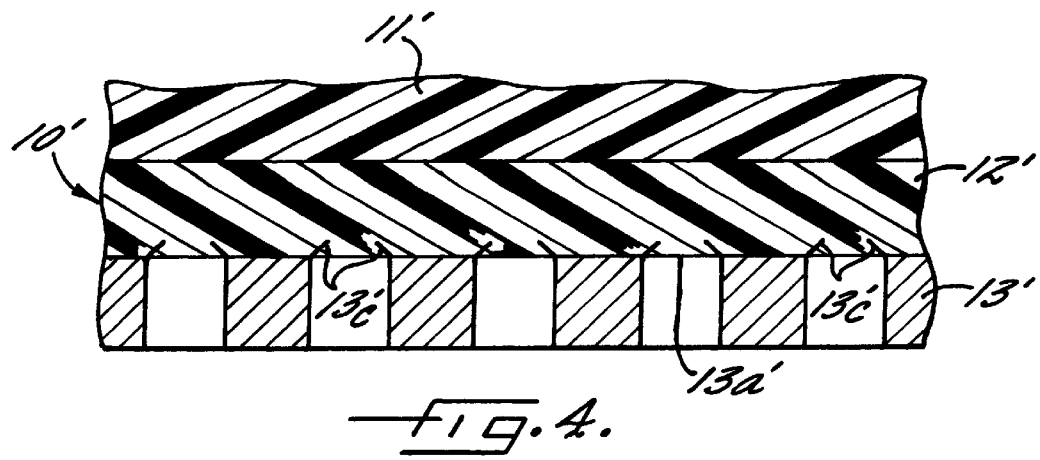
FIG. 4 is a view similar to FIG. 3 of another embodiment of the composite material of the present invention.

Referring now more particularly to the drawings and specifically to FIG. 1, there is illustrated a preferred method of forming a composite material generally indicated at 10. Cushioning material 10 includes a first layer 11 of plastic film in which are formed a plurality of spaced apart concave cavities 11a which have openings thereinto in a first major surface 11b of layer 11 (FIG. 2). A second layer 12 of plastic film is superposed onto layer 11 and has a first major surface 12a thereof laminated to the first major surface 11b of layer 11 over the land areas between and around the cavities 11a.

First and second layers 11 and 12 form a cushioning material commonly referred to as air cellular material. Air cellular material is manufactured by a number of different manufacturers including Sealed Air Corporation, the assignee of this application.

Layers 11 and 12 may be formed of any suitable thermoplastic film. It has been determined that layers 11 and 12 should preferably be formed of a composite of several thermoplastic materials for best results. Such films are well-known and commercially available. Examples of air cellular materials formed of such film are AIR-CAP® and POLY-CAP® manufactured by Sealed Air Corporation.

A third layer 13 of suitable material is superposed onto second layer 12 and has a first major surface 13a thereof mechanically bonded to a second major surface 12b of the second layer 12 over at least portions of the contiguous surfaces 12b and 13a. Preferably, layer 13 is mechanically bonded to layer 12 over substantially the entirety of the contiguous surfaces 12b and 13a.

As used herein, the term "mechanically bonded" shall mean "held together by mechanical action or interlocking, as opposed to fusion bonding occurring upon heat lamination or heat sealing."

Layer 13 may be formed of any suitable material providing the characteristics desired for that surface of the composite material 10. Most of such materials are readily available commercially.

Examples of surface characteristics which may be found desirable are: non-abrasiveness, softness, hydrophilic, hydrophobic, opacity, ultraviolet reflectivity, heat reflectivity, toughness and others too numerous to mention. Examples of materials which may be used to form third layer 13 are: fibrous materials which may be formed in any conventional manner from natural or synthetic fibers; metal foils; coated substrates; and others that will be known to those skilled in the art.

As illustrated in FIGS. 1–3, layer 13 is formed of a non-woven fibrous batt of natural or synthetic fibers, such as, for example, polyester fibers. This non-woven batt includes a multiplicity of fibers 13c projecting outwardly from the surface 13a. Fibers 13c are embedded in the plastic forming the layer 12 and are mechanically held therein. Such embedded fibers 13c serve to interlock the layers 12 and 13 together and provide a mechanical bond therebetween.

There are many materials which do not normally have projections extending outwardly from the surface thereof to be embedded in the plastic of layer 12. Accordingly, some alternate form of mechanical bond must be provided.

Figure 5:
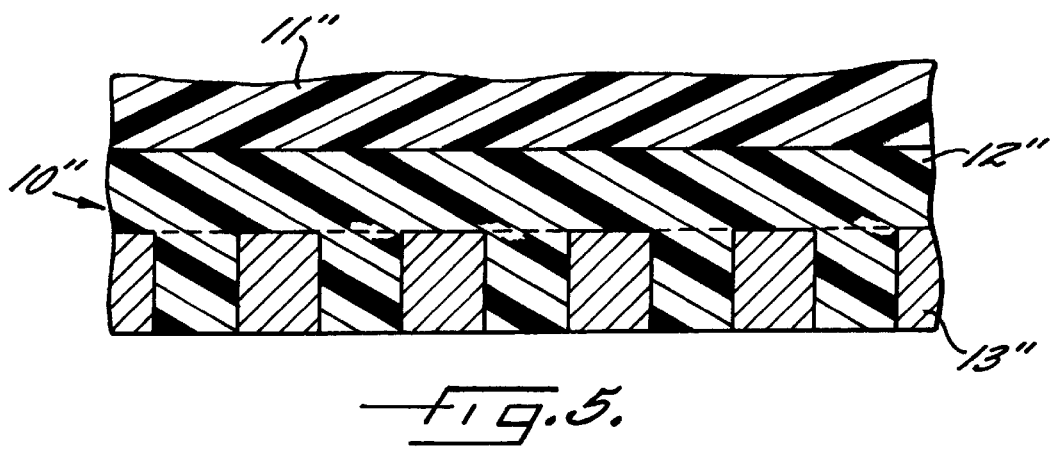
FIG. 5 is a view similar to FIGS. 3 and 4 of a further embodiment of the composite material of the present invention.
Figure 6:
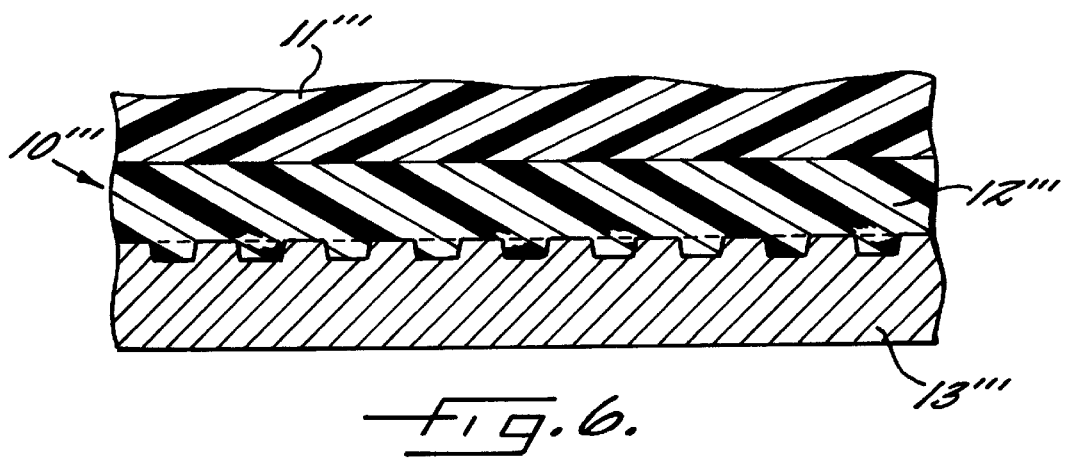
FIG. 6 is a view similar to FIGS. 3–5 of a still further embodiment of the composite material of the present invention.

FIGS. 4–6 illustrate three different, additional embodiments of composite materials having different forms of mechanical bonds. In FIG. 4, there is illustrated a composite material 10' including a first layer 11' and a second layer 12' laminated together to form an air cellular material. A third layer 13' is mechanically bonded to layer 12' by projections 13c' on the surface 13a' and embedded in the plastic of layer 12'. Projections 13c' may be formed in any suitable manner, such as by punching, slicing, etc. As illustrated, the layer 13' has been punched to form holes therein and to form the projections 13c' by deflecting the punched-out material outwardly.

In FIG. 5, there is illustrated a composite material 10" in which third layer 13c" has holes punched or otherwise formed therein. The plastic forming layer 12" is softened and caused to flow into the holes in third layer 13' until such holes are filled. The plastic of layer 12" is then caused to harden to interlock layers 12" and 13" together and provide the mechanical bond.

In FIG. 6, a composite material 10''' is illustrated in which the third layer 13''' has cavities formed in the surface 13a'''. The plastic of layer 12''' is softened and caused to flow into and fill these cavities. Upon hardening, the plastic of layer 12''' and the cavities of third layer 13''' form the mechanical bond.

A preferred embodiment of the method of the present invention is illustrated in FIGS. 1 and 2. Air cellular material may be formed in many different ways by different methods. Examples of such methods are disclosed in U.S. Pat. Nos. 2,585,915; 2,776,451; 2,776,452; 3,026,231; 3,208,898; 3,285,793; 3,405,020; 3,416,984 and 5,116,444.

The coextrusion method disclosed in U.S. Pat. No. 5,116,444 is preferred, and that patent is incorporated herein by reference. A first extruder 17 extrudes the first layer 11 of thermoplastic film into contact with the outer peripheral surface of an embossing roll 20 having cavities 21 in the outer surface thereof. Cavities 21 have openings 22 extending between the bottoms of the cavities 21 and a chamber 23 inside embossing roll 20. Chamber 23 has a vacuum drawn thereon in a manner not shown. The vacuum drawn on cavities 21 through openings 22 draws portions of the first layer 11 into the cavities 21 to form concave cavities 11a in the first layer 11.

A second extruder 30 extrudes a second layer 12 of thermoplastic film onto the surface of embossing roll 20 at a location spaced downstream of the location at which the first layer 11 contacts embossing roll 20 so that the second layer 12 is brought into superposed relation to the first layer 11 after the cavities 11a have been formed therein. Because of the heated nature of the first and second layers 11 and 12, the second layer 12 will be almost instantly laminated or fusion bonded to the first layer 11 over their contiguous surfaces entrapping air in the cavities 11a and forming the multiplicity of spaced apart gas air bubbles.

The third layer 13 of fibrous or other suitable material is fed from a roll 35 onto the embossing roll 20 and into superposed relation to the second layer 12 at a location sufficiently close to the extruder 30 such that the surface 12b of layer 12 is still sufficiently soft to bond mechanically the third layer 13 to layer 12 in a manner previously described.

To assist the mechanical bonding of third layer 13 to layer 12, a roller 40 contacts the outside surface 13b of layer 13 prior to and at the point of first contact of layer 13 with layer 12 and during mechanical bonding thereof.

In the drawings and specification, there has been set forth a preferred embodiment of the invention, and although specific terms are employed, they are used in a generic and descriptive sense only and not for purposes of limitation, the scope of the invention being set forth in the following claims.

In the claims:

1. A composite material for protecting or cushioning articles comprising
   first and second layers of plastic film laminated together and defining a multiplicity of spaced apart, gas filled cavities therebetween, and
   a third layer of a material which is incompatible with said first and second layers such that said third layer is incapable of being fusion bonded to either of said first and second layers, said third layer including opposite surfaces having predetermined surface characteristics different from said layers of plastic film, one of said surfaces of said third layer being disposed in contiguous relation to an outer surface of one of said first and second layers of plastic film and having spaced apart projections extending outwardly beyond the remainder of said surface of said third layer, said projections being embedded in the plastic layer contiguous thereto which is otherwise undisturbed, such that said third layer is mechanically bonded to said one of said first and second layers of plastic film to interlock the contiguous surfaces thereof without the plastic of said first or second layer flowing into and through said remainder of said surface of said third layer, whereby a composite material is formed having such predetermined surface characteristics on one side thereof.

2. A composite material according to claim 1 wherein said third layer is formed of a fibrous material.

3. A composite material according to claim 2 wherein said third layer is a non-woven fibrous batt.

4. A composite material according to claim 2 wherein said third layer is formed of a material selected from a group consisting of: metal foil, hydrophilic material, hydrophobic material, and materials with non-abrasive surfaces.

5. A composite material according to claim 1 wherein said third layer is formed of a fibrous material and said projections are fibers extending outwardly therefrom.

6. A composite material according to claim 5 wherein said fibrous material is formed of natural fibers.

7. A composite material according to claim 5 wherein said fibrous material is formed of synthetic fibers.

8. A composite material according to claim 5 wherein said fibrous material is a non-woven batt of fibers.

9. A composite material according to claim 8 wherein said fibers are polyester.

10. A composite material according to claim 1 wherein said first layer of plastic film has said cavities formed therein and said second layer of plastic film closes said cavities and is substantially flat, and wherein said third layer is mechanically bonded to said second layer.

11. A method of forming a composite material for protecting or cushioning an article, said method comprising providing first and second layers of plastic film laminated together and defining a multiplicity of spaced apart, gas filled cavities therebetween, providing a third layer having predetermined surface characteristics different from said layers of plastic film, said surface characteristics including spaced apart projections extending outwardly from the remainder of the surface of said third layer, said third layer being formed of a material incompatible with said first and second layers such that said third layer is incapable of being fusion bonded to either of said first and second layers, causing an outer surface of one of said first and second layers to be in a softened state, placing said third layer in superposed, contiguous relation to said softened surface of said layer of plastic film while causing said projections to penetrate into and become embedded in said softened surface without said softened surface flowing into and through said remainder of said surface of said third layer, and causing said softened surface to harden while mechanically bonding the contiguous surfaces or said third layer and said one of said first and second layers of plastic film.

12. A method according to claim 11 herein said first and second layers of plastic film are laminated together by co-extrusion of said first and second layers while forming said gas-filled cavities therebetween.

* * * * *

UNITED STATES PATENT AND TRADEMARK OFFICE
CERTIFICATE OF CORRECTION

PATENT NO.    : 6,183,838 B1
DATED         : February 6, 2001
INVENTOR(S)   : Kannankeril It is certified that error appears in the above-identified patent and that said Letters Patent is hereby corrected as shown below:

<u>Title page,</u>
Item [56] References Cited, U.S. Patent Documents,
Line 2, "Weingarven" should read -- Weingarten --;

<u>Column 5,</u>
Line 16, "claim 2" should read -- claim 1 --;

<u>Column 6,</u>
Line 28, "herein" should read -- wherein --.

Signed and Sealed this

Twenty-third Day of October, 2001

Attest:

Attesting Officer

NICHOLAS P. GODICI
*Acting Director of the United States Patent and Trademark Office*